(12) United States Patent
Westphall et al.

(10) Patent No.: US 7,920,384 B2
(45) Date of Patent: Apr. 5, 2011

(54) FAN CAGE FOR COMPUTER SYSTEMS

(75) Inventors: Paul E. Westphall, Tomball, TX (US); Robert L. Martinez, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1396 days.

(21) Appl. No.: 11/199,845

(22) Filed: Aug. 9, 2005

(65) Prior Publication Data

US 2007/0035924 A1    Feb. 15, 2007

(51) Int. Cl.
*H05K 7/16* (2006.01)
*H05K 7/20* (2006.01)

(52) U.S. Cl. .................. 361/727; 361/726; 361/695

(58) Field of Classification Search .......... 361/687, 361/695, 724–727; 439/325
See application file for complete search history.

(56) References Cited

U.S. PATENT DOCUMENTS

| | | | |
|---|---|---|---|
| 6,213,819 B1 * | 4/2001 | Fan | 439/894 |
| 6,236,564 B1 * | 5/2001 | Fan | 361/695 |
| 6,270,046 B1 | 8/2001 | Liu et al. | |
| 6,373,698 B1 * | 4/2002 | Christensen | 361/695 |
| 6,400,568 B1 | 6/2002 | Kim et al. | |
| 6,435,889 B1 | 8/2002 | Vinson et al. | |
| 7,009,841 B2 * | 3/2006 | Chen et al. | 361/695 |
| 7,230,826 B2 * | 6/2007 | Kyle et al. | 361/695 |
| 2003/0026074 A1 * | 2/2003 | Clements et al. | 361/695 |
| 2004/0130872 A1 * | 7/2004 | Cravens et al. | 361/695 |

* cited by examiner

*Primary Examiner* — Jayprakash N Gandhi
*Assistant Examiner* — Nidhi Desai

(57) ABSTRACT

Fan cage assemblies for computer systems are disclosed. In an exemplary embodiment a method may comprise providing a single-enclosure fan cage to house a plurality of fan assemblies in a chassis of a computer system. The method may also comprise fastening the fan cage to the chassis of the computer system with a quick-connect latch system.

2 Claims, 7 Drawing Sheets

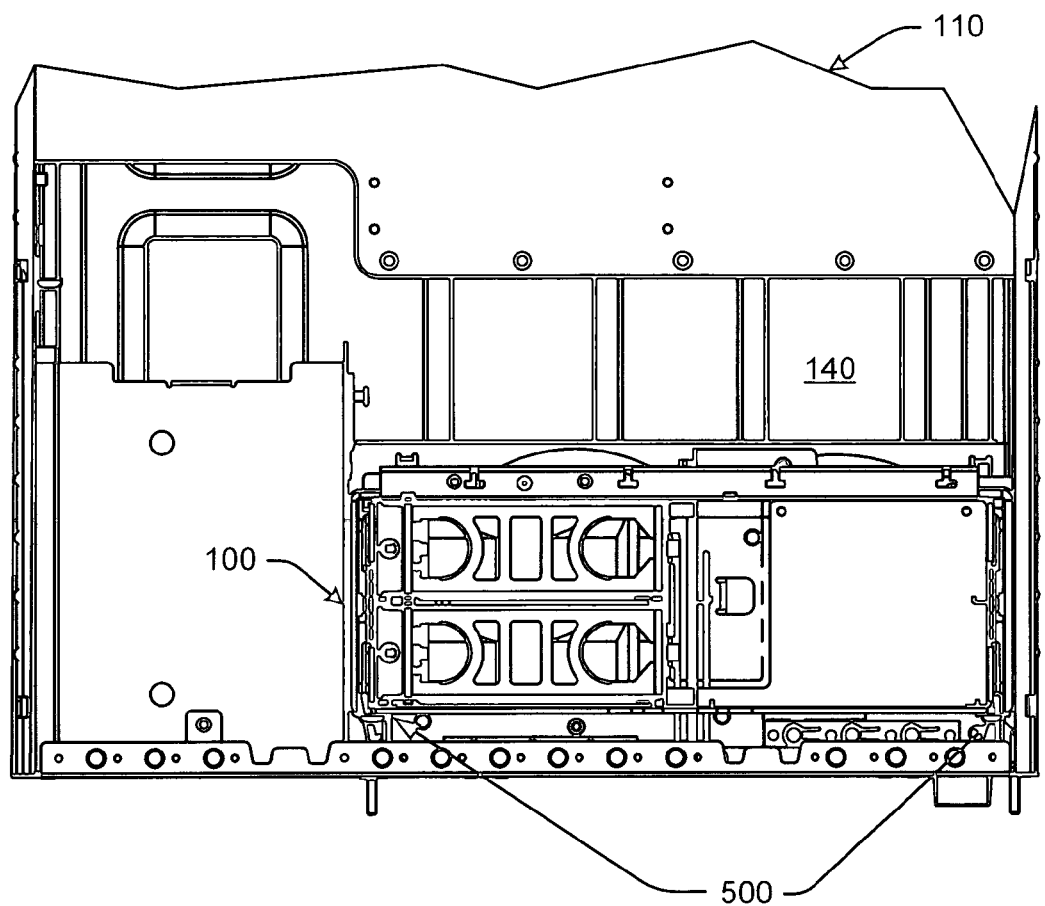

FAN CAGE FOR COMPUTER SYSTEMS

TECHNICAL FIELD

The described subject matter relates generally to computer systems, and more particularly to a fan cage for computer systems.

BACKGROUND

Processors, power supplies, and other hardware components for computer systems are typically cooled during operation by one or more electric fans. Each fan may be mounted in a fan cage, which in turn is mounted to a chassis of the computer system. The user may need to remove one or more of these fans, e.g., to replace a fan that is no longer functioning properly, or to add additional fans for redundancy. The user may also need to remove the fan cage, e.g., in order to have access to other components in the computer system.

In order to remove a fan from the computer system, the user has to unplug electrical cabling to the fan, and then unscrew the fan from the fan cage. In order to remove the fan cage, the user has to first remove the fan from the fan cage, as just described, and then unscrew the fan cage from the chassis. This can be a time-consuming process. In addition, if the user does not properly align the fan or the fan cage during installation or reinstallation, the fan may not function properly.

BRIEF DESCRIPTION OF THE DRAWINGS

FIG. 3a is bottom view of one of the fan assemblies shown in FIG. 3, illustrating an electrical connection for providing power to the fan assembly

FIG. 5 is a top plan view of an exemplary fan cage and portion of a computer system showing an exemplary alignment system for aligning the fan cage in the computer system.

DETAILED DESCRIPTION

Figure 1A:
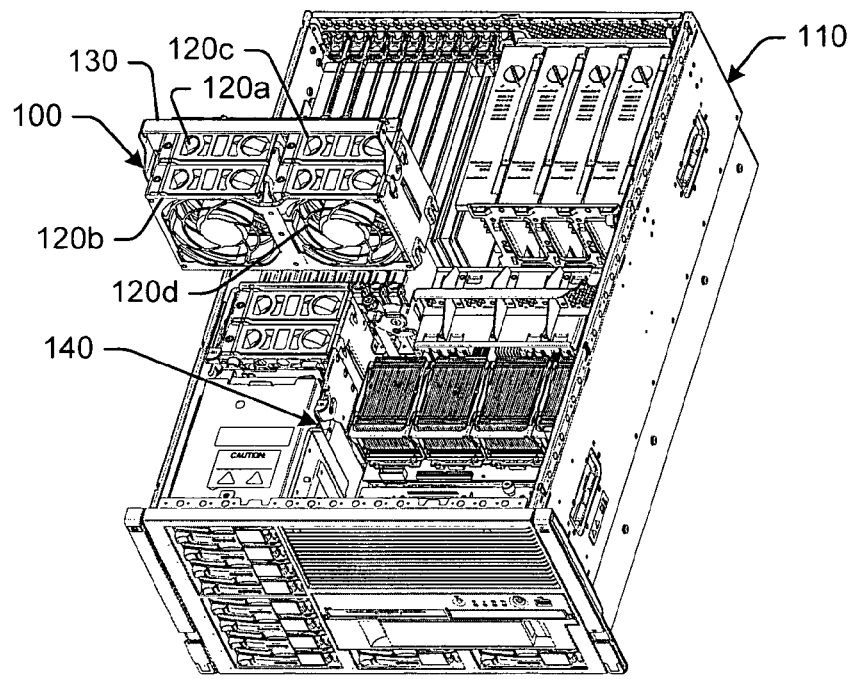
FIGS. 1a and 1b are top perspective views of an exemplary fan cage and computer system, showing (a) the fan cage outside of the computer system, and (b) the fan cage mounted within the computer system.
Figure 1B:
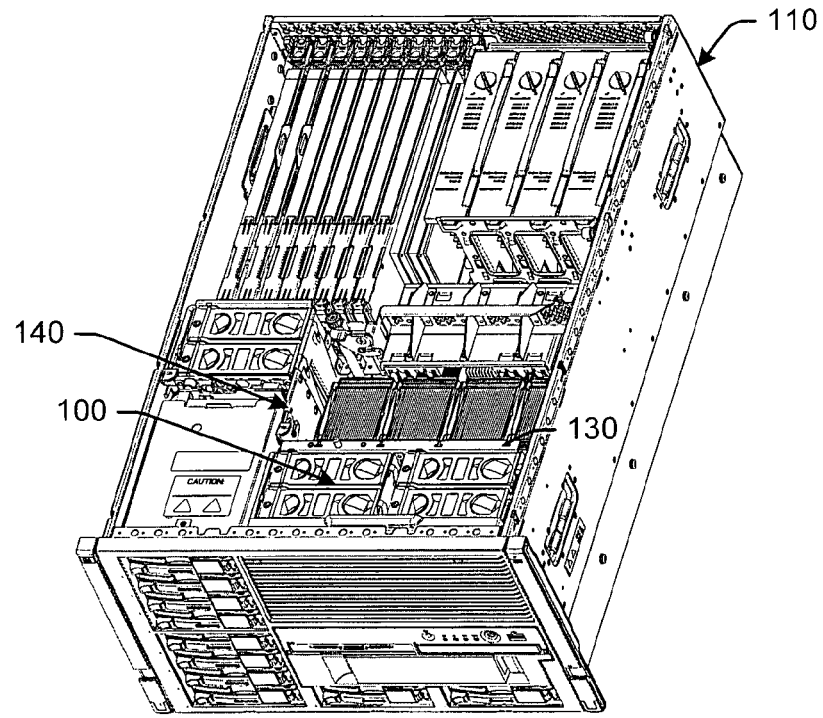

FIGS. 1a and 1b are top perspective views of an exemplary fan cage 100 and computer system 110, showing (a) the fan cage 100 outside of the computer system 110, and (b) the fan cage 100 mounted within the computer system 110. Fan cage 100 is shown as it may be implemented in a server computer. However, it is noted that the fan cage 100 is not limited to use with any particular type or configuration of computer system 110. For example, fan cage 100 may be implemented with other computer systems 110, such as, e.g., a personal desktop or laptop computer.

Fan cage 100 may be implemented as a single enclosure for simultaneously installing a plurality of fan assemblies in the computer system 110. In FIGS. 1a and 1b, four fan assemblies 120a-d are shown mounted in the fan cage 100 in two rows of two each. It is noted, however, that the fan cage 100 may be configured for any number of fan assemblies 120a-d. For example, the fan cage 100 may also be configured for a single row of two fans. Other configurations are also contemplated. In addition, not all of the fan assemblies 120a-d need to be installed in the fan cage 100.

Fan cage 100 may include a handle 130 for inserting and removing the fan cage 100 in a chassis 140 of the computer system 110. In an exemplary embodiment, the handle 130 may be moved into an upright position (FIG. 1a) so that a user can readily grasp the handle to insert and remove the fan cage 100 with all of the fan assemblies 120a-d in the chassis 140. The handle 130 may also be moved into a collapsed position (FIG. 1b) to save space within the computer system after the fan cage 100 is installed. In addition, moving the handle 130 into the collapsed position may also serve to lock the fan cage 100 to the chassis 140, as described in more detail below with reference to FIGS. 6a and 6b.

It is noted that the embodiments of fan cage 100 described herein are provided for purposes of illustration and are not intended to limit the fan cage 100 to any particular configuration. In an alternative embodiment, for example, the handle 130 may be removed from the fan cage 100 after installing the fan cage 100 in the computer system 110. According to such an embodiment, the same handle may be used with more than one fan cage.

Although the fan cage 100 is shown in FIG. 1b mounted to the chassis 140 at the front of the computer system 110, it is noted that the fan cage 100 may be mounted to the chassis 140 in any desired position, such that the fan assemblies 120a-d function to cool the processors, memory, PCI expansion cards, power supplies, and/or other hardware components in the computer system 110. In other embodiments, more than one fan cage may also be mounted to the chassis of a single computer system.

Figure 2:
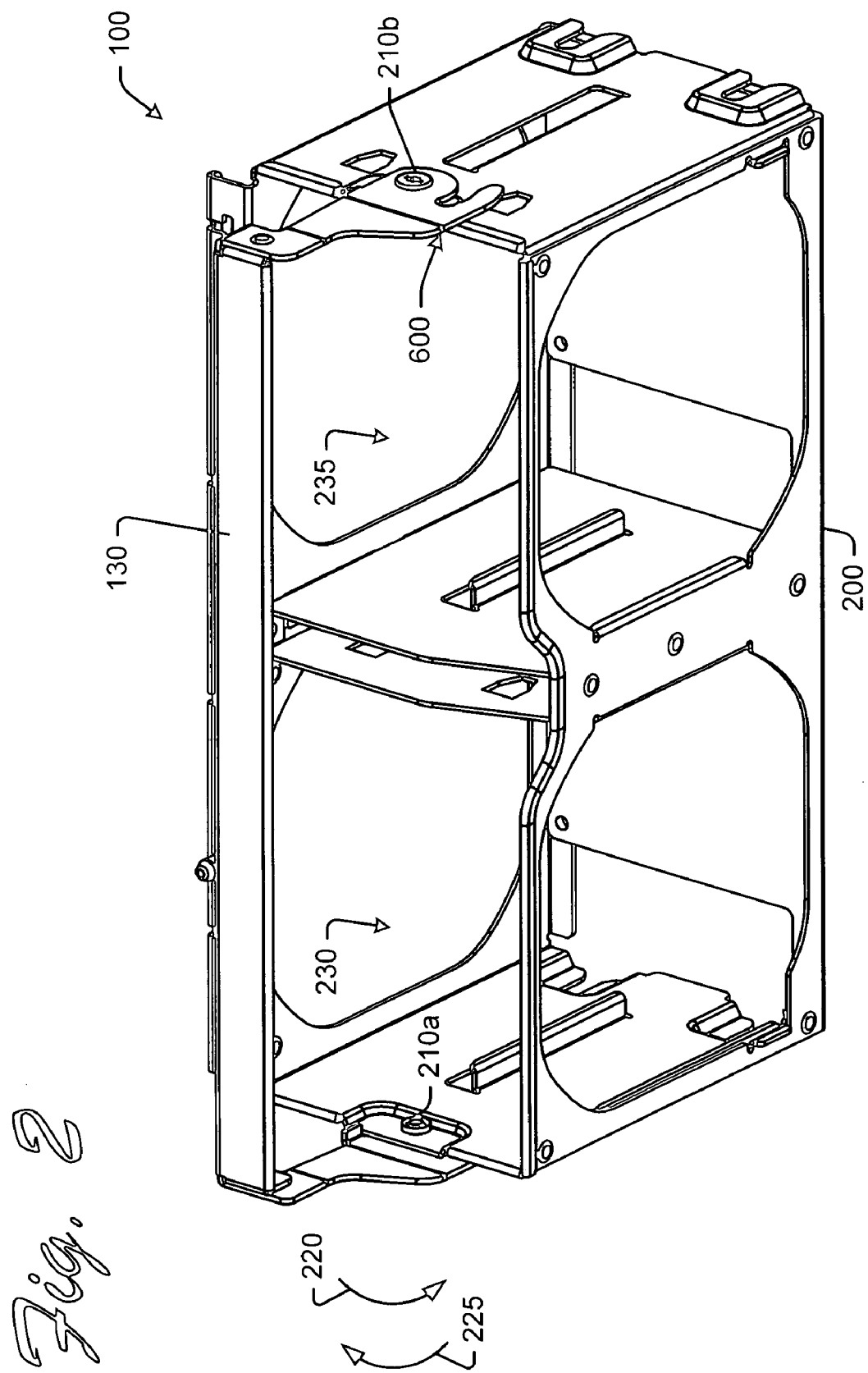
FIG. 2 is a detailed perspective view of an exemplary fan cage.

FIG. 2 is a detailed perspective view of an exemplary fan cage, such as the fan cage 100 shown in FIGS. 1a and 1b. Exemplary fan cage 100 may be manufactured from metal (e.g., steel). It is noted, however, that the fan cage 100 may also be made of other materials, such as a hardened plastic or combination of metal and plastic. The material used for fan cage 100 will depend at least to some extent on design considerations, such as, but not limited to, desired strength of the fan cage 100, the weight of the fan(s), and the weight that fan cage 100 contributes to overall weight of the computer system 110.

Fan cage 100 may include a housing 200 for the fan assemblies (e.g., fan assemblies 120a-d shown in FIGS. 1a and 1b). The housing 200 may be provided with a handle 130 for inserting and removing the fan cage 100 in the chassis 140 of computer system 110.

In an exemplary embodiment, handle 130 may be pivotally mounted on each end to the housing 200, e.g., by fasteners 210a and 210b. Accordingly, the handle 130 may be operated to move in the direction of arrow 220 into a collapsed position (as shown in FIG. 1b), and in the direction of arrow 225 into an upright position (as shown in FIG. 2). It is noted, however, that in other embodiments the handle 130 may be integrally formed as part of the housing 200 or otherwise fixedly mounted to the housing 200.

Housing 200 may be configured such that it defines at least one chamber for receiving a plurality of fan assemblies (e.g., the fan assemblies 120a-d shown in FIGS. 1a and 1b). Housing 200 is shown in FIG. 2 defining two fan chambers 230, 235 for receiving up to four fan assemblies, as discussed in more detail with reference to FIG. 3.

Figure 3:
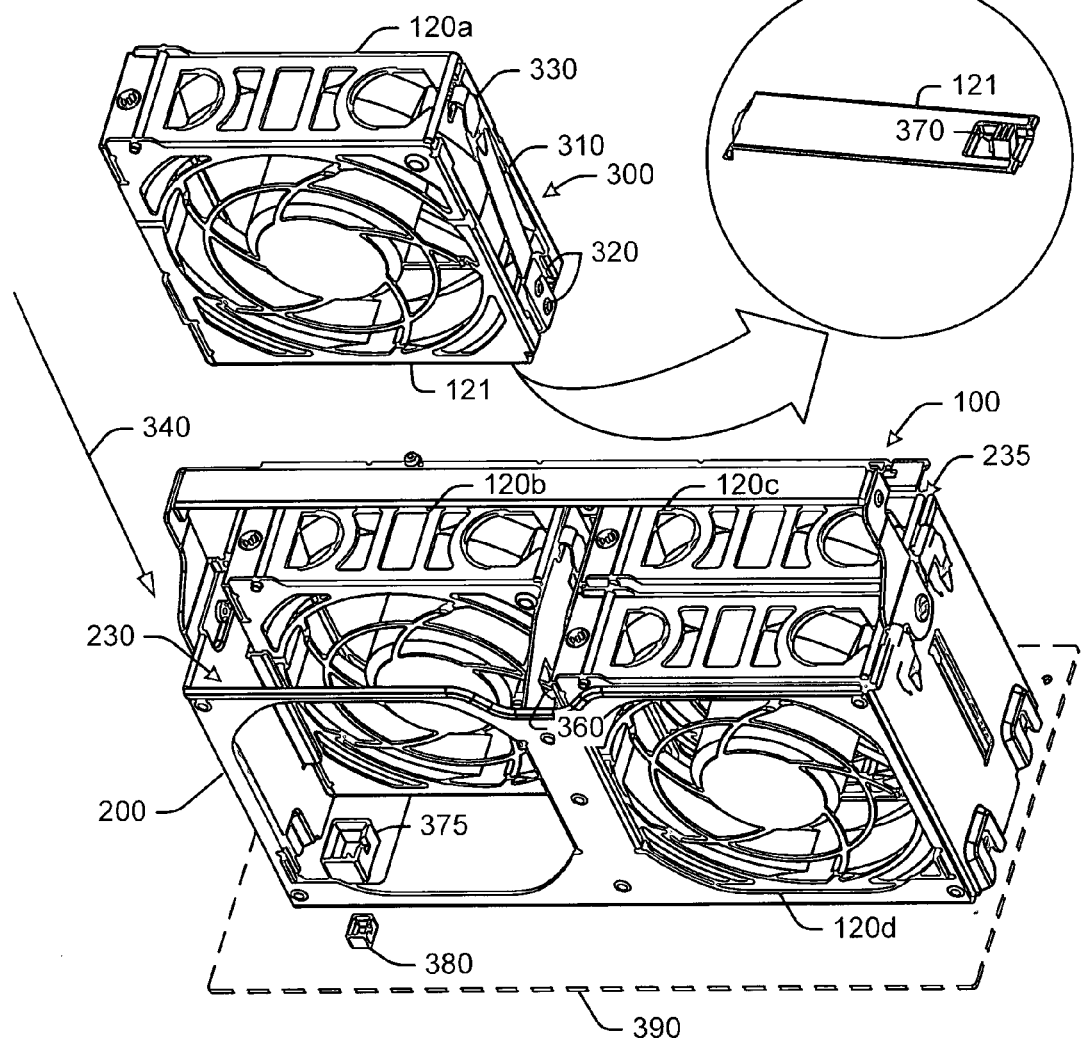
FIG. 3 is another detailed perspective view of an exemplary fan cage and fan assemblies.

FIG. 3 is another detailed perspective view of an exemplary fan cage and fan assemblies, such as the fan cage 100 and fan assemblies 120a-d shown in FIGS. 1a and 1b. Exemplary fan cage 100 is configured to receive up to four fan assemblies 120a-d. Each fan chamber 230 and 235 is configured to receive two fan assemblies, for a total of four fan assemblies. For example, fan assemblies 120a-b may be received in fan chamber 230, although fan assembly 120a is shown in FIG. 3 positioned outside of the fan cage 100 for purposes of illustration. Fan assemblies 120c-d may be received in fan chamber 235. It is noted, however, that the fan cage 100 is not limited to such a configuration.

In an exemplary embodiment, fan assemblies 120a-d may be mounted to the fan cage 100 by means of a lock system 300. Lock system 300 may be implemented as a quick-connect lock system, including locking member 310. Although the locking member 310 is only visible on fan assembly 120a in FIG. 3, it is noted that each of the fan assemblies 120a-d may be provided with a locking member 310.

With reference to fan assembly 120a, an exemplary locking member 310 may be implemented as spring or resilient finger provided on one side of the fan assembly 120a. The resilient finger is fastened on one end to the fan assembly 120a (e.g., by fasteners 320). The opposite end (or top portion) 330 of the resilient finger extends outward from the fan assembly 120a and is biased in this default position.

As the fan assembly 120a is inserted into the fan cage 100 (e.g., in the direction of arrow 340), the top portion 330 of the resilient finger flexes toward the fan assembly 120a in the direction of arrow 350. Accordingly, the fan assembly 120a fits readily between the walls of chamber 230. When the fan assembly 120a is received within the chamber 230, the top portion 330 of the resilient finger returns toward the default position in the direction of arrow 355, expanding into opening 360 formed in the walls of chamber 230. The fan assembly 120a is then "locked" in the fan cage 100, as illustrated in FIG. 3 by the fan assemblies 120b-d.

The lock system 300 may also be operated to release the fan assemblies (e.g., fan assembly 120a) from the fan cage 100. In an exemplary embodiment, an external force may be applied (e.g., by the user pressing his or her finger) against top portion 330 of the resilient finger extending into the opening 360 formed in the wall of the chamber 230 to release the locking member 310. The fan assembly 120a may then be slid out of the chamber 230 to remove the fan assembly 120a from the fan cage 100. Accordingly, the quick-connect lock system 300 enables a user to readily install and remove the fan assemblies 120a-d in the fan cage 100, e.g., without having to use tools.

Fan assemblies 120a-d may also be mounted in the fan cage 100 such that an electrical connection is provided by the computer system 110. For example, fan assemblies 120a-d may include a quick-connect electrical connection, as shown in more detail in FIG. 3a.

FIG. 3a is bottom view of fan assembly 120a shown in FIG. 3, illustrating an electrical connection for providing power to the fan assembly 120a. When the fan assembly 120a is mounted within chamber 230 of the fan cage 100, electrical connector 370 mates with receptacle or interconnect 375 mounted to a bottom portion of the chamber 230 (FIG. 3). When fan cage 100 is mounted in the computer system 110, electrical connector 375 couples with a mating electrical connector 380 mounted on the chassis 140 on a computer board 390 (shown in dashed lines in FIG. 3) of the computer system 110. Accordingly, the fan assemblies 120a-d may be provided with electrical power from the computer system without having to separately connect cables to the fan assemblies.

Figure 4:
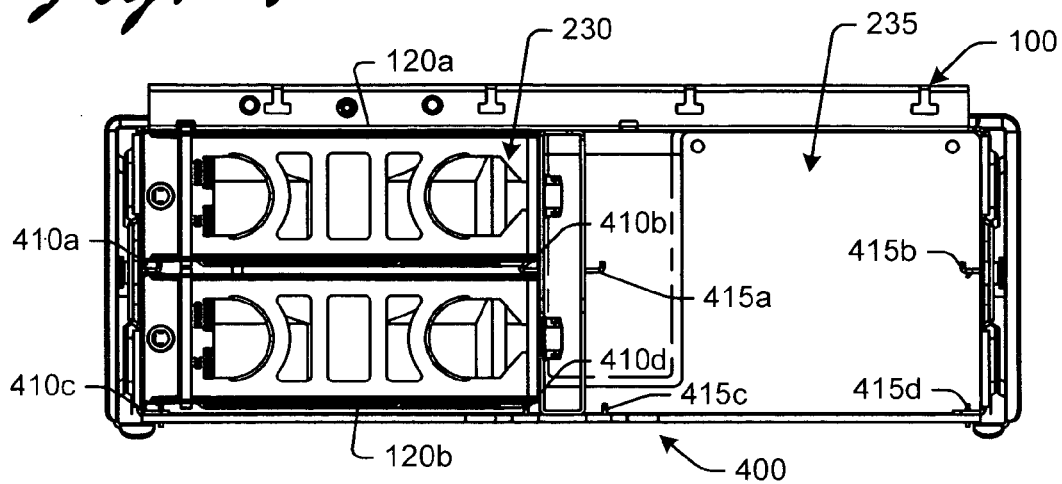
FIG. 4 is a top plan view of an exemplary fan cage showing an exemplary alignment system for aligning fan assemblies in the fan cage.

FIG. 4 is a top plan view of an exemplary fan cage showing an exemplary alignment system 400 for aligning fan assemblies in the fan cage, such as the fan assemblies 120a-d and fan cage 100 shown in FIG. 1. It is noted that only fan assemblies 120a and 120b are shown in FIG. 4 to simplify the drawing.

Exemplary alignment system 400 may include one or more guide flanges 410a-d and 415a-d formed as part of (or otherwise mounted to) chambers 230, 235, respectively. Exemplary alignment system 400 may also include corresponding guide tabs 420 provided on the fan assemblies (e.g., as shown in more detail in FIGS. 4a and 4b).

During an install operation, fan assembly 120a fits within the chamber 230 in a predetermined orientation. For example, the predetermined orientation may be based on the orientation needed for the electrical connection, and/or the direction needed for the fan assembly to provide the desired airflow.

Figure 4A:
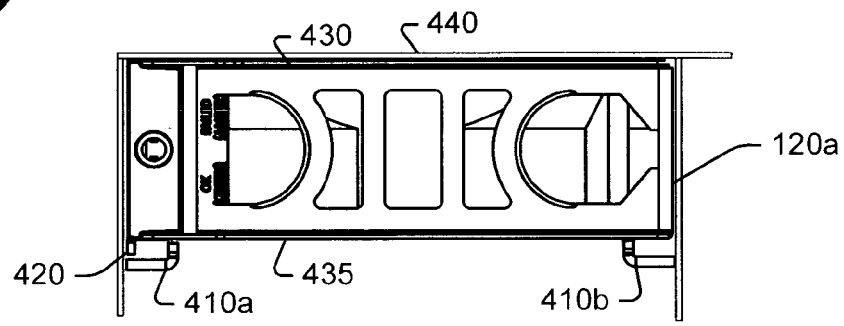
FIG. 4a is a detailed top plan view of a portion of the fan cage shown in FIG. 4 further illustrating a fan assembly aligned to fit in the fan cage.

FIG. 4a is a detailed top plan view of a portion of the fan cage 100 shown in FIG. 4 further illustrating one of the fan assemblies 120a aligned to fit in the fan cage 100. When the fan assembly 120a is properly aligned (i.e., in the predetermined orientation), the walls 430, 435 of the fan assembly 120a fit between the outer wall 440 of the fan cage 100 and the guide flange 410a, 410b, and the guide tab 420 is received adjacent the guide flange 410a.

Figure 4B:
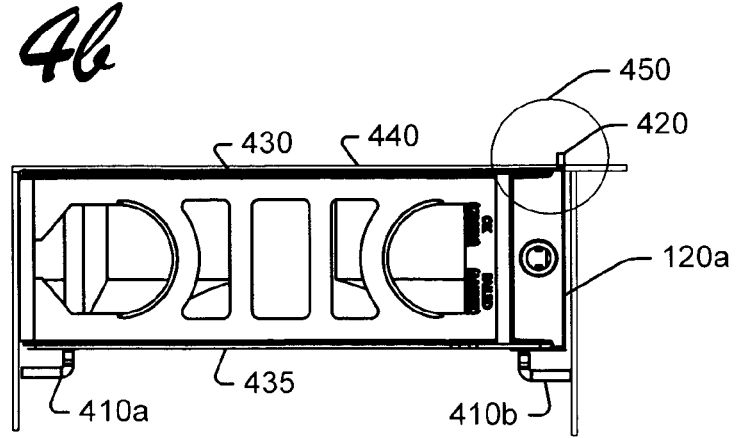
FIG. 4b is a detailed top plan view of a portion of the fan cage shown in FIG. 4 further illustrating a fan assembly misaligned with the fan cage.

FIG. 4b is a detailed top plan view of a portion of the fan cage 100 shown in FIG. 4 further illustrating one of the fan assemblies 120a misaligned with the fan cage 100. When the fan assembly 120a is not properly aligned (e.g., rotated 180° as shown in FIG. 4b), the guide tab 420 contacts the outer wall 440 of the fan cage 100, as illustrated in circle 450. Accordingly, the fan assembly 120a cannot be inserted into the chamber 230 of the fan cage 100.

FIG. 5 is a top plan view of an exemplary fan cage and portion of a computer system showing an exemplary alignment system 500 for aligning the fan cage in the computer system, such as the fan cage 100 and computer system 110 shown in FIG. 1. It is noted that only a portion of the computer system 110 is shown in FIG. 5 to simplify the drawing.

Exemplary alignment system 500 may include a mounting assembly 510 (as shown in more detail in FIGS. 5a and 5b) provided on the chassis 140 of computer system 110, and alignment tabs 520, 525 on the fan cage 100. The mounting assembly 510 may have walls (or wall portions) 530-534 at least partially surrounding the fan cage 100 when the fan cage 100 is installed on the chassis 140.

During an install operation, fan cage 100 fits within the walls 530-534 of the mounting assembly in a predetermined orientation. For example, the predetermined orientation may be based on the orientation needed for the electrical connection, and/or the direction needed for the fan assembly to provide the desired airflow.

Figure 5A:
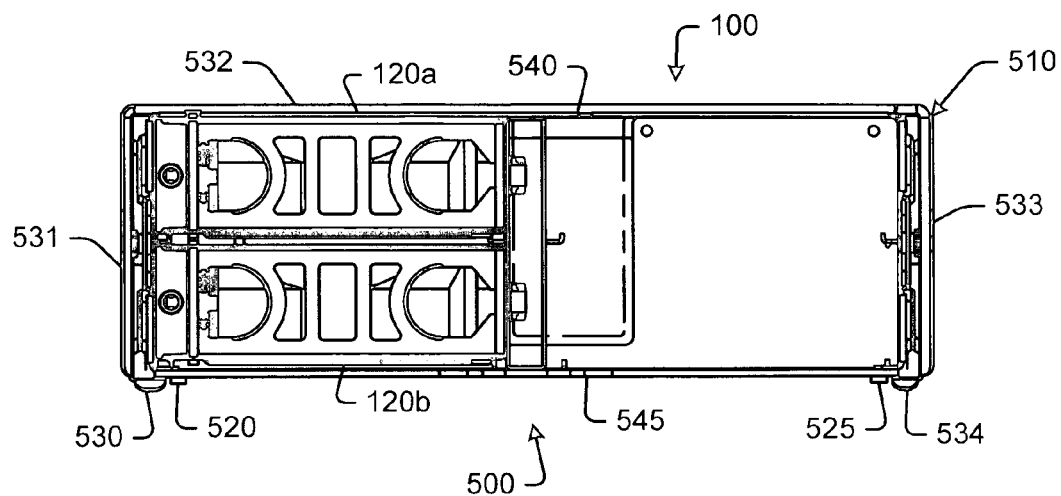
FIG. 5a is a detailed top plan view of the fan cage shown in FIG. 5 aligned to fit in a portion of the computer system.

FIG. 5a is a detailed top plan view of the fan cage 100 aligned to fit in a portion of the computer system 110. When the fan cage 100 is properly aligned (i.e., in the predetermined orientation), the walls 540, 545 of the fan cage 100 fit between the outer wall 532 of the mounting assembly 510 and the wall portions 530, 534. The alignment tabs 520, 525 are received adjacent the wall portions 530, 534.

It is noted that in an alternative embodiment, the outer wall 532 does not need to extend fully between sidewalls 531 and 533. For example, outer wall 532 may be provided as wall portions, similar to wall portions 530 and 534, but still serving to abut the alignment tabs 520, 525 and prevent insertion of a misaligned fan cage 100.

Figure 5B:
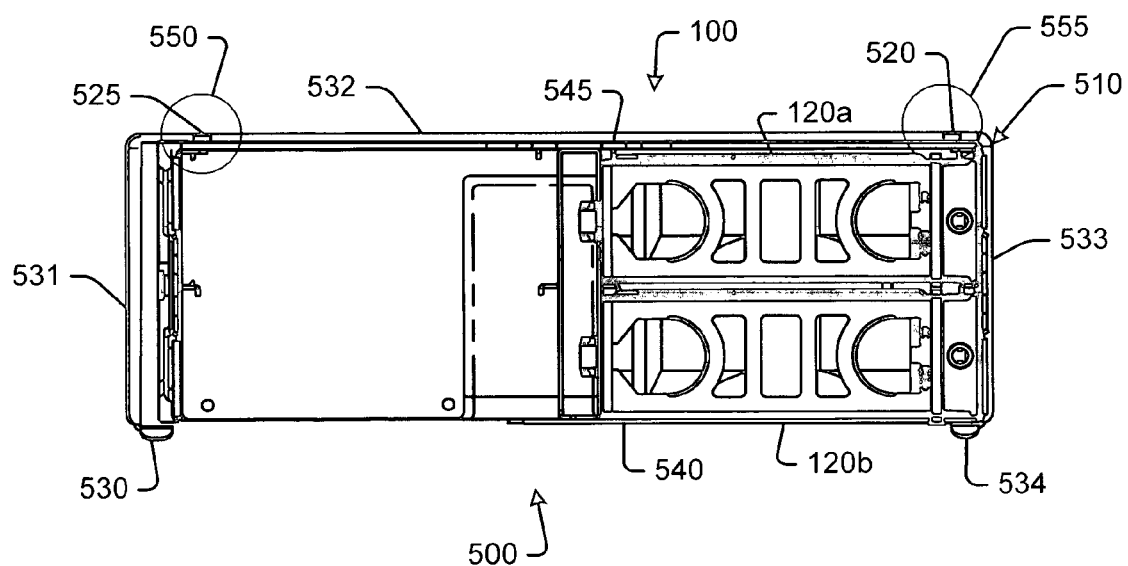
FIG. 5b is a detailed top plan view of the fan cage shown in FIG. 5 misaligned with the computer system.

FIG. 5*b* is a detailed top plan view of the fan cage 100 misaligned with the computer system 110. When the fan cage 100 is not properly aligned (e.g., rotated 180° as shown in FIG. 5*b*), the alignment tabs 520, 525 contact the outer wall 532 of the mounting assembly 510, as illustrated in circles 550, 555. Accordingly, the fan cage 100 cannot be readily inserted into the computer system 110.

Figure 6A:
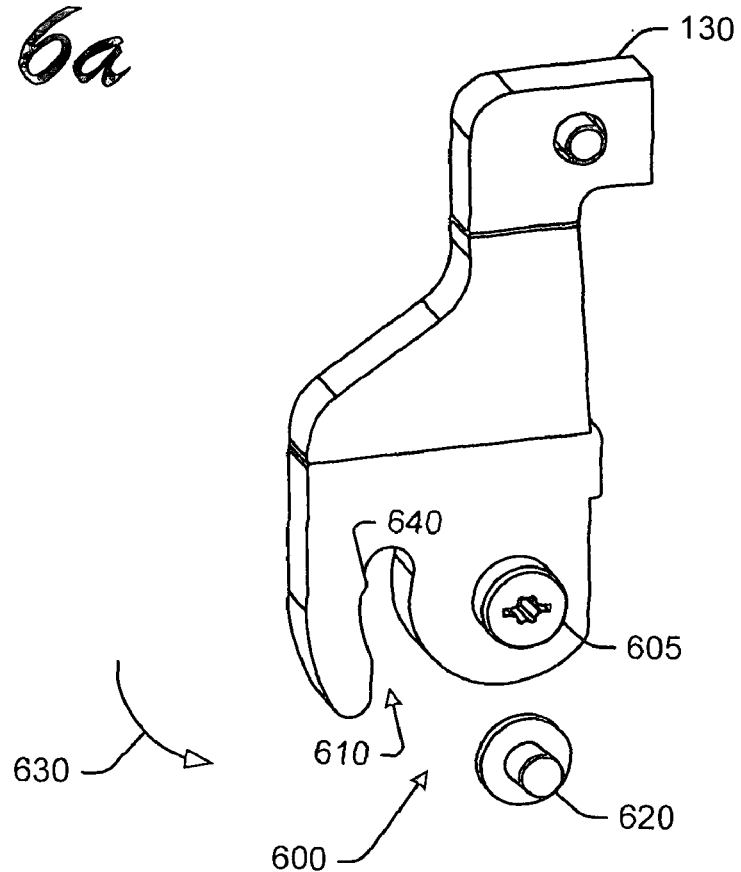
FIGS. 6a and 6b are detailed side views showing a portion of an exemplary latch system which may be implemented to secure a fan cage to a chassis of a computer system, showing (a) the latch system in an open position, and (b) the latch system in a closed position.
Figure 6B:
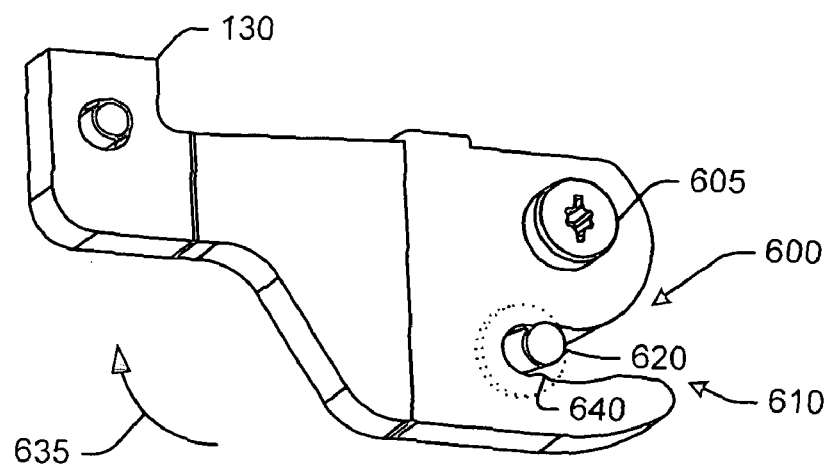

FIGS. 6*a* and 6*b* are detailed side views of an exemplary latch system 600 which may be implemented to secure a fan cage to the chassis of computer system 110, showing (a) the latch system 600 in an open position, and (b) the latch system 600 in a closed position.

Latch system 600 may be provided as part of (or otherwise mounted to) the handle 130 of the fan cage 100, as can be seen in FIG. 2. In an exemplary embodiment, latch system 600 is implemented as a quick-connect fastener which enables the fan cage 100 to be readily mounted to the chassis 140 of computer system 110, e.g., without having to use tools. It is noted, however, that fan cage 100 is not limited to use with a quick-connect type latch system.

Exemplary latch system 600 may include a cam slot 610 configured to engage a cam shaft 620 mounted to the chassis 140 of the computer system 110. Latch system 600 may be operated by moving the handle 130 so that it pivots about pin 605 (e.g., shown as fasteners 220*a* and 220*b* in FIG. 2) in the direction of arrow 630 into the collapsed position (FIG. 6*b*) to lock the fan cage 100 to the chassis 140. Latch system 600 may also be operated by moving the handle 130 in the direction of arrow 635 into the upright position (FIG. 6*a*) to release the fan cage 100 from the chassis 140.

The cam slot 610 may also include a positive locking feature 640. In an exemplary embodiment, positive locking feature 640 may be implemented as a ridge formed in the cam slot 610 which engages and closes around the cam shaft 620 in the closed position (FIG. 6*b*). Accordingly, the positive locking feature 640 provides "shock absorption," and protects against unintentionally unlocking the latch system 600 (e.g., during transport).

It is noted that the exemplary embodiments discussed above are provided for purposes of illustration. Still other embodiments are also contemplated. In addition to the specific embodiments explicitly set forth herein, other aspects and embodiments will be apparent to those skilled in the art from consideration of the specification disclosed herein. It is intended that the specification and illustrated embodiments be considered as examples only.

The invention claimed is:

1. A fan cage comprising: a housing defining at least one chamber for receiving a plurality of fan assemblies; an alignment system provided on the housing to prevent misalignment of the housing in a computer chassis; and at least one latch system provided separately from the alignment system, the at least one latch system configured for quick-connect mounting the housing to the computer chassis; a handle mounted to the housing, the handle rotatable between an upright position and a collapsed position; wherein the handle operates the at least one latch system for quick-connect mounting the housing to the computer chassis when the handle is moved between the upright position and the collapsed position; and wherein the fan cage further comprising a cam slot formed on the handle, the cam slot engaging a cam shaft on the computer chassis to lock the housing to the computer chassis.

2. A computer system comprising: a chassis; a plurality of fan assemblies; a fan cage for mounting the plurality of fan assemblies to the chassis, wherein the fan cage comprises: an alignment system to prevent misalignment of the fan cage during mounting of the fan cage to the chassis; and a quick-connect latch system for locking the fan cage to the chassis, wherein the alignment system and quick-connect latch system are separate components; wherein the quick-connect latch system comprises a handle, the handle rotating into an upright position to unlock the fan cage from the chassis, and the handle rotating into the collapsed position to lock the fan cage to the chassis; and wherein the quick-connect latch system comprises a cam slot formed on the handle, the cam slot engaging a cam shaft on the chassis to lock the fan cage to the chassis.

* * * * *